(12) United States Patent
Zettel et al.

(10) Patent No.: US 6,536,483 B2
(45) Date of Patent: Mar. 25, 2003

(54) LARGE WIRE LOOP FILTERS AND MECHANICAL DAMPERS

(75) Inventors: Steven Zettel, Cranston, RI (US); Michael McCarthy, Lincoln, RI (US)

(73) Assignee: ACS Industries, Inc, Woonsocket, RI (US)

( * ) Notice: Subject to any disclaimer, the term of this patent is extended or adjusted under 35 U.S.C. 154(b) by 0 days.

(21) Appl. No.: 09/862,820

(22) Filed: May 22, 2001

(65) Prior Publication Data

US 2002/0174907 A1 Nov. 28, 2002

(51) Int. Cl.$^7$ ................................................. B21F 27/18
(52) U.S. Cl. ..................................... 140/71 R; 267/147
(58) Field of Search ........................... 140/71 R, 71 C; 29/896.62; 267/147

(56) References Cited

U.S. PATENT DOCUMENTS

| | | | | |
|---|---|---|---|---|
| 501,221 A | * | 7/1893 | Wagener | 140/71 R |
| 2,218,559 A | * | 10/1940 | Stephens | 140/71 R |
| 2,462,316 A | * | 2/1949 | Goodloe | 140/71 R |
| 2,672,214 A | * | 3/1954 | Goodloe | 140/71 R |

* cited by examiner

Primary Examiner—Lowell A. Larson
(74) Attorney, Agent, or Firm—Bradley N Ruben

(57) ABSTRACT

Present day wire knitting machines are used to make wire mesh used in the manufacture of filters for airbag assemblies, catalytic converter seals, mechanical dampers, and the like, but are unable to knit large diameter wire, especially wire having a diameter greater than 0.025 inches. Provided herein is a looped wire made by wrapping the wire around a mandrel in multiplie layers and then pressed to flatten the loops. Thereafter, the flattened loop is formed using the same processes suitable for forming wire mesh into such articles.

15 Claims, 1 Drawing Sheet

LARGE WIRE LOOP FILTERS AND MECHANICAL DAMPERS

Background of the Invention

1. Field of the Invention

This invention relates to mechanical devices, such as filters and dampers, made from large wire (>0.025" diameter) loops, and to methods for making the same.

2. The State of the Art

Knitted wire mesh is used for a wide variety of articles, from scrubbing pads to filters for the hot gases generated when airbags deploy to mechanical dampers. These meshes are made on knitting machines designed for using wire instead of thread, and so the devices have very strong needles around which the wire is wrapped as it is knitted. These knitting machines can only operate on wire having a diameter up to about 0.030" (about 0.762 mm); thicker wire diameters induce stress cracks in the needles of the knitting machines, causing them to break.

There are applications for wire mesh structures, such as in airbags and mechanical dampers (energy absorbers), where the use of a larger diameter wire would be more useful. A larger diameter wire provides increased mass for cooling the hot gases released from the gas generating charge in airbag cans, and increased strength for withstanding the blast when the gas is generated. Likewise, a larger diameter wire provides increased strength and resistance to deformation for mechanical dampers made from wire mesh. Thus, larger wire diameters absorb more energy, both thermal and kinetic, and sustain filter integrity during the explosive deployment of the airbag because it takes longer to reach a temperature where the material begins to degrade.

SUMMARY OF THE INVENTION

In light of the foregoing, one object of this invention is to provide a large wire loop mesh for such applications as airbag filters and mechanical dampers. Another object of this invention is to provide such devices with wires of at least 0.025" (about 0.6 mm), more preferably at least 0.028" (about 0.7 mm), and most preferably at least 0.035" (about 0.9 mm) in diameter, although the invention can be used with any wire diameter. Yet another object of this invention is to produce such devices without the use of present wire knitting machines that are limited in the size of the wire that can be knit.

In summary, this invention provides a large wire loop having at least two layers of wire suitable for forming into a wire mesh device wherein the wire in the loop is preferably greater than 0.028" in diameter, most preferably greater than 0.035" in diameter. Also provided is an article made from large wire loop that has been formed in a mold.

In another embodiment, this invention provides such large wire loops by the process of wrapping a large diameter wire around a mandrel, removing it from the mandrel, flattening the tubular wire loop, and forming the flattened wire loop into the desired device in a mold.

DETAILED DESCRIPTION OF SPECIFIC EMBODIMENTS

Devices in which molded wire mesh, especially knitted wire mesh, are used include filters for airbags (such as disclosed in co-pending application Ser. No. 282,372, filed Mar. 31, 1999, now U.S. Pat. No. 6,277,166, the disclosure of which is incorporated herein by reference), seals for catalytic converters for automobiles (such as disclosed in co-pending application Ser. No. 459,733, filed Feb. 13 1999, now U.S. Pat. No. 6,286,840, the disclosure of which is incorporated herein by reference), mechanical dampers, and other thermal and mechanical energy dissipation devices, and the like. Woven wire mesh is not moldable (because some of the wires will end up perpendicular to the direction of molding, and so will not be modified). Knitted wire mesh has loops, and so it is compressible and moldable. Likewise, in this invention, the formation of large wire loops provides the same aspects that make knitted wire mesh moldable, and so this invention is useful for making the same types of articles of manufacture.

Figure 1:
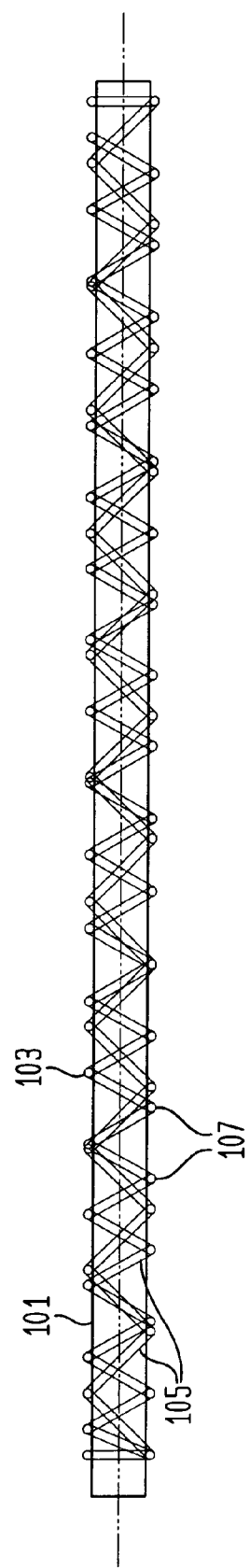
FIG. 1 depicts two layers of wire wrapped onto a mandrel.
Figure 2:
FIG. 2 depicts the wire loop from FIG. 1 that has been flattened.

Instead of using a wire knitting machine, the present devices are formed by taking a large wire and, as shown in FIG. 1, providing a mandrel 101 and wrapping the wire 103 around the mandrel. A second, and optionally further wires, are then be wrapped over the first wrapping. The wrapped wire is then removed from the mandrel in the form of a tubular loop having at least two layers. The tube is then flattened between nip rolls, resulting in an article as shown in FIG. 2. The entire flattened loop is then placed into the female portion of a static mold and pressed with a tamp (male portion of the mold) into the desired configuration.

The different pitch and/or frequency of the loops, and the opposite directions of winding, allow the loops to interlock when, after the tube is flattened, they are are formed into the desired article of manufacture in a mold. Different pitches are preferred for promoting interlocking of the loops during molding. This interlocking is beneficial because it provides increased strength and integrity to the article. Preferably, the wires are wound around the mandrel such that their lengths along the mandrel are essentially coextensive.

Articles of manufacture such as airbag filters, catalyst seals, mechanical dampers, and the like made of knitted wire are made by taking a single wire mesh, and compressing and forming it in a mold into the desired configuration. Preferably such molding, termed herein "compression molding" (a term typically applied to a method for molding plastics), is performed by providing a female mold having the desired configuration of the article, and a male molding member that acts as a ram, such as the plunger of a press. The looped wire from the mandrel of this invention is flattened between hard rubber rolls or a similar apparatus. Thereafter, the flattened wire is placed into the female portion of the mold, which may require some manipulation of the flattened wire. The ram is then pressed into the mold to form the desired article of manufacture.

Because the particular articles of manufacture mentioned above are formed from a looped wire (whether a knitted wire or the large looped wire of the present invention), the article of manufacture is often specified with respect to having a certain density. Based on the particular density specified, one can back-calculate the length of wire needed to provide the weight for the particular volume of the article on which the density is based. Thereafter, one need only wrap that amount of wire onto the mandrel, flatten it, and shape it in the mold to provide the article having the specified density. Of course, a longer mandrel may be needed for longer lengths of wire, and/or one can use a shorter mandrel with more turns of the wire, and/or one can use a mandrel having a different diameter (forming larger loops). In the end, the proper length of wire is provided as a tube, flattened, and then shaped in a mold to provide the desired article of manufacture.

In another embodiment, a very long piece of wound wire can be provided on the mandrel, either by using a large number of turns or by using a very long mandrel, then removed and the wire tube cut into sections of desired length, each having the amount of wire appropriate for a particular article to be later molded; the wire can be cut before or after having been flattened. Round wire or flat wire can be used; in either case, the looped article must be flattened to load it into the molding tool. In yet another embodiment, multiple wires can be wound onto the mandrel; for example, one can be wound clockwise and the other counterclockwise.

Especially for airbag assemblies, the wire composition is preferably a carbon steel wire; for a mechanical energy absorber, an austenitic alloy, such as Inconel, or 304, 309, or 430 (a marstenitic) stainless steel, is preferred. The desired material depends on the end us of the final article. In contrast with spring wire, which has a high tensile strength and low elongation, the wire suitable for the present invention have high elongation and lower tensile strength so that it can be compression molded according to this invention (else it will spring back, at least partly, to its original, pre-molded configuration).

As the large looped wire of this invention is made, it is preferred to vary the pitch of the wire along the mandrel; the "pitch" being the phase (number of turns per unit length) or the angle the wire makes with the axis of the mandrel. As shown in FIG. 1, the pass forming loops 105 has a lower pitch (fewer turns per unit length of mandrel) than loops 107. Making loops of different pitches facilitates interlocking when the flattened loops are compression molded; for example, some loops can then fit within other loops and be locked therein.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. An article of manufacture, comprising: a large diameter wire formed into loops on a mandrel and shaped by compression molding into said article, said wire having a diameter of greater than 0.025 inches.

2. The article of claim 1, wherein the wire diameter is at least 0.035 inches.

3. The article of claim 1, wherein the article is in the form of a filter suitable for use in an airbag assembly.

4. The article of claim 1, wherein the article is in the form of a seal for a catalytic converter.

5. The article of claim 3, wherein the wire has a diameter of at least 0.035 inches.

6. The article of claim 5, wherein the wire is carbon steel.

7. The article of claim 4, wherein the wire is 304 or 309 stainless steel.

8. A method for producing an article of manufacture, comprising:
   providing a predetermined length of large diameter wire having a diameter of greater than 0.028 inches;
   providing a mandrel;
   wrapping said wire around said mandrel to form a wire tube having at least two layers;
   flattening said wire tube in a direction essentially orthogonal to the axis of the tube to produce a flattened length of looped wire;
   providing a female mold having the desired configuration for said article of manufacture; and
   molding said flattened length of looped in said mold by compression with a ram.

9. The method of claim 8, wherein the predetermined length of wire is provided in at least two pieces and each piece is wrapped around the mandrel.

10. The method of claim 9, wherein at least two of said pieces are wrapped around the mandrel in opposing directions.

11. The method of claim 8, wherein the number of turns of the wire around the mandrel is different for said two layers.

12. The method of claim 8, wherein the predetermined length is provided as a single piece of wire.

13. The method of claim 8, wherein the wire tube has wires of different pitches.

14. The method of claim 8, further comprising cutting the wire tube into a desired length, and wherein it is the desired length of cut wire that is molded.

15. The method of claim 8, further comprising cutting the flattened length of looped wire into a desired length and wherein it is the desired length of flattened looped wire that is molded.

* * * * *